US010069904B2

(12) United States Patent
Singh et al.

(10) Patent No.: US 10,069,904 B2
(45) Date of Patent: Sep. 4, 2018

(54) IP ROUTING POOL DISTRIBUTION AMONG FORWARDING ELEMENTS IN SDN SERVICE CORE DEPLOYMENT

(71) Applicant: CISCO TECHNOLOGY, INC., San Jose, CA (US)

(72) Inventors: Akshya Kumar Singh, Fremont, CA (US); David Alan Johnson, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 14/923,146

(22) Filed: Oct. 26, 2015

(65) Prior Publication Data

US 2017/0118275 A1    Apr. 27, 2017

(51) Int. Cl.
*G06F 15/173* (2006.01)
*H04L 29/08* (2006.01)
*H04L 29/12* (2006.01)

(52) U.S. Cl.
CPC ...... *H04L 67/1002* (2013.01); *H04L 61/2007* (2013.01)

(58) Field of Classification Search
CPC . H04L 67/1002; H04L 61/2007; H04L 45/02; H04L 45/50; H04L 45/22; H04L 45/24; H04L 45/74
USPC ........................................................ 709/226
See application file for complete search history.

(56) References Cited

U.S. PATENT DOCUMENTS

| 7,003,574 | B1 * | 2/2006 | Bahl ...................... H04L 29/06 709/203 |
| 8,141,156 | B1 * | 3/2012 | Mao ...................... H04L 45/021 709/223 |
| 9,559,866 | B2 * | 1/2017 | Grayson ............. H04L 43/0876 |
| 9,590,824 | B1 * | 3/2017 | Sikand ............... H04L 12/4666 |
| 9,660,897 | B1 * | 5/2017 | Gredler .................. H04L 45/04 |
| 9,693,262 | B2 * | 6/2017 | Gunnarsson .......... H04W 28/08 |
| 9,755,898 | B2 * | 9/2017 | Jain ..................... H04L 41/0813 |
| 2006/0080446 | A1 * | 4/2006 | Bahl ...................... H04L 29/06 709/227 |

(Continued)

OTHER PUBLICATIONS

Karimzadeh, et al., "Applying Sdn/OpenFlow in Virtualized LTE to support Distributed Mobility Management (DMM)," CLOSER 2014: 4th International Conference on Cloud Computing and Services Science, Apr. 3-5, 2014, Barcelona, Spain; 6 pages.

(Continued)

*Primary Examiner* — Kristie Shingles

(57) ABSTRACT

An example method for load-balanced IP pool distribution among a plurality of forwarding elements is provided. The method may include assigning a plurality of IP pool chunks to the plurality of forwarding elements, each IP pool chunk comprising a plurality of IP addresses, and receiving, from each of the forwarding elements, information indicative of a load on each forwarding element. The method may further include performing load balancing using the information indicative of the load on each forwarding element to determine whether re-assignment of the plurality of IP pool chunks is needed, and re-assigning at least one IP pool chunk of the plurality of IP pool chunks from a first forwarding element to a second forwarding element based on the load balancing.

20 Claims, 6 Drawing Sheets

(56) References Cited

U.S. PATENT DOCUMENTS

| | | | |
|---|---|---|---|
| 2011/0235595 A1* | 9/2011 | Mehta | H04W 8/082 |
| | | | 370/329 |
| 2012/0166618 A1 | 6/2012 | Dahod et al. | |
| 2013/0058358 A1 | 3/2013 | Fulton et al. | |
| 2015/0109995 A1 | 4/2015 | Mathai et al. | |
| 2017/0093703 A1* | 3/2017 | Natu | H04L 12/2852 |

OTHER PUBLICATIONS

Open Network Foundation, "Software-Defined Networking: The New Norm for Networks," ONF White Paper, Apr. 13, 2012, 12 pages.

* cited by examiner

IP ROUTING POOL DISTRIBUTION AMONG FORWARDING ELEMENTS IN SDN SERVICE CORE DEPLOYMENT

TECHNICAL FIELD

This disclosure relates in general to the field of communications and, more particularly, to a system and method for Internet Protocol (IP) routing pool distribution among forwarding elements in Software Defined Network (SDN) service core deployment.

BACKGROUND

Wireless networks are telecommunications networks that use radio waves to carry information from one node in the network to one or more receiving nodes in the network. Cellular telephony is characterized by the use of radio cells that provide radio coverage for a regional or geographic area, with multiple cells arranged to provide contiguous radio coverage over a larger regional or geographic area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such devices can connect to a network (e.g., the Internet) as long as the user is within range of such a wireless communication technology. When such a device initially connects to a network, an IP address is assigned to the device. The IP address is later used to carry data.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
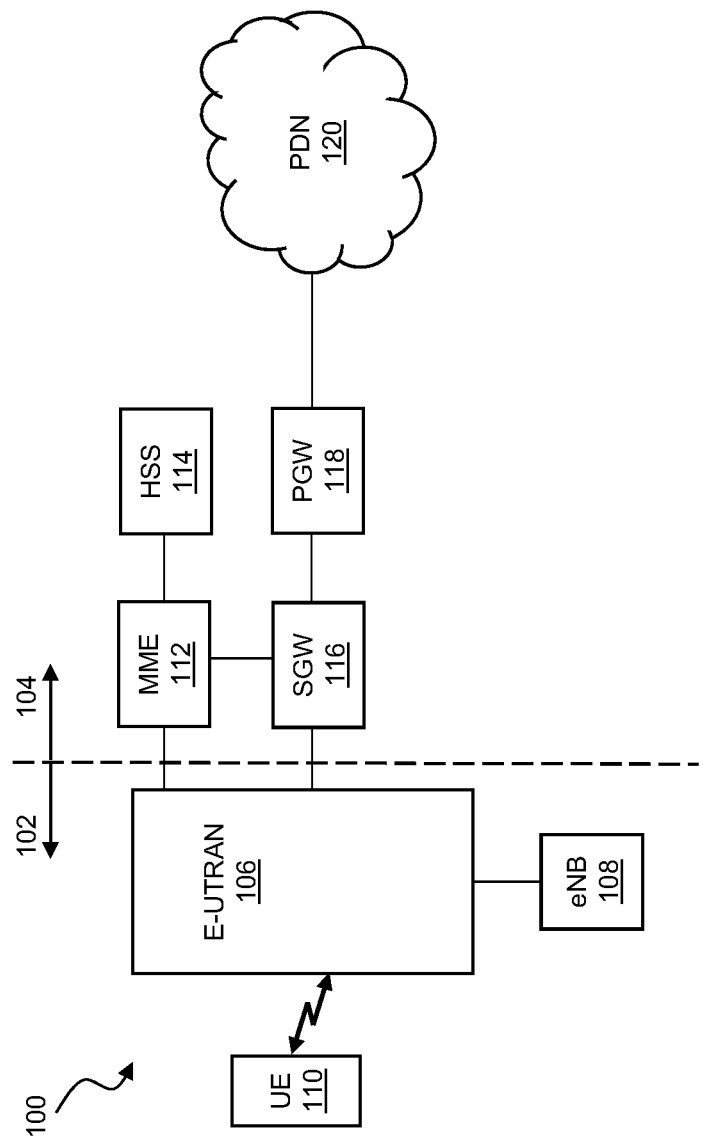
FIG. 1 is a simplified block diagram illustrating an exemplary communication system in a network environment, according to some embodiments of the present disclosure.

One aspect of the present disclosure provides a computer-implemented method, referred to herein as a "IP pool distribution method," for providing load-balanced IP routing pool distribution in a network environment. The method could be implemented by a functional entity referred to herein as an "IP pool distribution logic." Various parts of the method could be implemented by a gateway, in particular by a packet data network (PDN) gateway (PGW) or any other network element associated with and/or communicatively coupled to the PGW. Therefore, in various embodiments, the IP pool distribution logic, or part thereof, could be implemented within any of these network elements or/and distributed among a plurality of network elements.

In one embodiment, the IP pool distribution method may include assigning a plurality of IP pool chunks to a plurality of forwarding elements, where each IP pool chunk includes a plurality of IP addresses. In other words, as used herein, the term "IP pool chunk" refers to a subset of IP addresses of a pool of IP addresses. The method further includes receiving, from each of the plurality of forwarding elements, information indicative of a load on each forwarding element, performing load balancing using the information indicative of the load on each forwarding element to determine whether re-assignment of the plurality of IP pool chunks is needed, and re-assigning at least one IP pool chunk of the plurality of IP pool chunks from a first forwarding element to a second forwarding element based on the load balancing.

In an embodiment, re-assigning the at least one IP pool chunk may include temporarily stopping assigning of IP addresses of the at least one IP pool chunk to new subscriber sessions, and re-assigning the at least one IP pool chunk from the first forwarding element to the second forwarding element when all existing subscriber sessions utilizing IP addresses of the at least one IP pool chunk have finished. Such an embodiment may advantageously ensure that no subscriber sessions are disrupted due to movement of the IP pool chunk from the first to the second forwarding element.

Alternatively, re-assigning the at least one IP pool chunk may include temporarily stopping assigning of IP addresses of the at least one IP pool chunk to new subscriber sessions, determining whether a number of existing subscriber sessions that utilize any of the plurality of IP addresses of the at least one IP pool chunk is below a threshold, and re-assigning the at least one IP pool chunk from the first forwarding element to the second forwarding element upon positive determination (i.e. re-assigning when the number of existing subscriber sessions that utilize any of the plurality of IP addresses of the at least one IP pool chunk is below the threshold). Such an embodiment may allow achieving a balance between the advantages resulting from re-assigning an IP pool chunk in view of a more optimal load balancing and the drawback of disrupting some existing subscriber sessions, which may become especially pronounced if some existing subscriber sessions are long-lived sessions.

In an embodiment, the method may also include assigning IP addresses of the at least one IP pool chunk to new subscriber sessions after the at least one IP pool chunk has been re-assigned from the first forwarding element to the second forwarding element.

In an embodiment that could be implemented with any of the embodiments described above, the method may further include triggering, enabling, or otherwise instructing advertisement of IP addresses of the at least one IP pool chunk after the at least one IP pool chunk has been re-assigned from the first forwarding element to the second forwarding element. Such an advertisement is typically carried out by an edge router.

In an embodiment, such advertisement may include sending one or more Border Gateway Protocol (BGP) update messages including network layer reachability information (NLRI) for the IP addresses of the at least one IP pool chunk. In one further embodiments, the one or more BGP update messages may further include a NEXT_HOP path attribute encoding an identification of the second forwarding element. In this manner, data destined to a subscriber to which a particular IP address of the IP pool chunk was assigned will be routed via the second forwarding element. As used herein in this Specification, the terms "subscriber" and "user" may be used interchangeably.

In an embodiment that could be implemented with any of the embodiments described above, the information indicative of the load on each forwarding element may include information indicative of packet and/or byte count of data traffic processed by the forwarding element.

In an embodiment that could be implemented with any of the embodiments described above, each IP address of the plurality of IP addresses may be an IP address for carrying user data between a User Equipment (UE) and an external packet data network (PDN), such as e.g. Internet, over a cellular wireless telecommunications network, such as e.g. LTE network.

In an embodiment that could be implemented with any of the embodiments described above, the information indicative of the load on each forwarding element is received using an Open Flow protocol.

As will be appreciated by one of ordinary skill in the art, aspects of the present disclosure, in particular the functionality related to IP routing pool distribution described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing PGWs and various control nodes) or be stored upon manufacturing of these devices and systems.

EXAMPLE EMBODIMENTS

Exemplary Network Environment

For purposes of illustrating the techniques for providing IP routing pool distribution among forwarding elements in SDN service core deployment, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

An exemplary network in which embodiments of the present disclosure can be implemented is illustrated in FIG. 1, providing a simplified block diagram illustrating a communication system 100 in a network environment according to one embodiment of the present disclosure. An exemplary configuration shown in FIG. 1 may be tied to the 3rd Generation Partnership Project (3GPP) Evolved Packet System (EPS) architecture, also sometimes referred to as the Long Term Evolution (LTE) EPS architecture. However, while FIG. 1 illustrates elements of LTE and the embodiments of the present disclosure are described with reference to LTE, various embodiments of the present disclosure and the depicted architectures are equally applicable, with modifications as would be apparent to a person of ordinary skill in the art to other telecommunications environments. Thus, in some instances, communication system 100 may include LTE access networks such as evolved UTRAN, generally referred to as 4G or LTE. In other instances, the communication system 100 may include other access networks such as GSM EDGE radio access network (GERAN), UMTS terrestrial radio access network (UTRAN), generally referred to as 3G, which can be provided using one or more NodeB/Radio Network Controllers (NodeB/RNCs), Home Node B's (HNBs), HNB gateways, Mobile Switching Centers (MSCs), serving General Packet Radio Service (GPRS) support nodes (SGSNs), and gateway GPRS support nodes (GGSNs). In yet other instances, communication system 100 may include non-3GPP networks, such as e.g. WiMAX.

In general, the communications system 100 may be viewed as comprising a radio access network (RAN) part 102 and a core network (CN) part 104, each part containing various network elements or nodes as described in greater detail below.

In LTE, the radio access network 102 includes an Evolved UMTS Terrestrial Radio Access Network (E-UTRAN) 106 and one or more evolved Node B (eNodeB) transceivers 108, and is used to provide wireless access for devices shown as User Equipment (UE) 110.

Sometimes the terms "LTE" and "E-UTRAN" are used interchangeably.

The eNB 108 is an LTE network radio network component configured to act as a radio access point for the UEs 110 by connecting to the E-UTRAN 106 and being responsible for radio transmission and reception from UEs 110 in one or more cells. Typically, the radio access network 102 includes a plurality of eNB transceivers such as the eNB 108. Furthermore, typically, the radio access network 102 includes further transceivers, not shown in FIG. 1, such as e.g. a 1×RTT transceiver, a high-rate packet data (HRPD) transceiver, and an evolved high-rate packet data (eHRPD) transceiver, each of which can connect to the radio access network 102. Other radio access technologies such as WiFi, Femto, WiMAX, or any other radio spectrum technology can use a further transceiver, not shown in FIG. 1, to connect to the network using a broadband or other access network.

In some embodiments, the eNB 108 may be a Home eNodeB (HeNB) radio access point, also referred to interchangeably as a 'HeNB access point', 'HeNB', 'small cell radio access point', 'small cell access point', 'small cell', 'femtocell' or 'femto'. An HeNB is typically configured to perform the same function of an eNB, but is optimized for deployment for smaller coverage than a typical, macro, eNB, such as e.g. indoor premises and public hotspots.

The eNB 108 represents, in general, any radio access points that can offer suitable connectivity to one or more UEs 110 using any appropriate protocol or technique. Thus, in general terms, eNB 108 represents a radio access point device that can allow UEs to connect to a wired network using Wi-Fi, Bluetooth™, WiMAX, 4G/LTE, or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), an HeNB, an HNB, or any other suitable access device, which may be capable of providing suitable connectivity to a given UE 110. In certain cases, the access point can connect to a router (via a wired network), which can relay data between different UEs of the network.

In various embodiments, UEs such as the UE 110 can be associated with users, employees, clients, customers, etc. wishing to initiate a flow in the communication system 100 via some network. The terms 'user equipment,' 'mobile node,' 'end user,' 'user,' and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within the communication system 100. UE 110 may also be inclusive of a suitable interface to a human user such as a microphone, a display, a keyboard, or other terminal equipment.

UE 110 may also be any device that seeks to initiate a communication on behalf of another entity or element such as a program, a database, or any other component, device, element, or object capable of initiating an exchange within the communication system 100. The term "data" as used herein refers to any type of numeric, voice, video, media, or script data, or any type of source or object code, or any other suitable information in any appropriate format that may be communicated from one point to another. In certain embodiments, UE 110 may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses for the access sessions can be assigned using dynamic host configuration protocol (DHCP), Stateless Address Auto-configuration, default bearer activation, etc., or any suitable variation thereof.

For a 3GPP EPS architecture (i.e. in LTE), the core network 104 is sometimes referred to as an Evolved Packet Core (EPC) and typically includes one or more mobility management entities (MMEs) 112, one or more home subscriber servers (HSSs) 114, one or more serving gateways (SGWs) 116, and one or more packet data network (PDN) gateways (PGWs) 118. In some embodiments, one or more of EPC components can be implemented on the same gateway or chassis as described below. The EPC elements may be provided in the service provider network to provide various UE services and/or functions, to implement Quality of Service (QoS) on packet flows and to provide connectivity for UEs to external packet data networks such as e.g. Internet, an exemplary PDN shown in FIG. 1 as a PDN 120.

The MME resides in the EPC control plane and manages node selection, session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN) (not shown in FIG. 1). The MME can also be integrated with 2G/3G elements, such as the SGSN and GGSN. This integration is the key to mobility and session management interworking between 2G/3G and 4G mobile networks.

The MME 112 is a control-node for the LTE access network. The MME may be responsible for UE tracking and paging procedures including retransmissions. The MME 112 may handle the bearer activation/deactivation process and may also be responsible for node selection of an SGW and PGW for a UE at the initial attach and at time of an intra-LTE handover. The MME may also authenticate the user by interacting with the HSS 114. In various embodiments, the MME 112 may also generate and allocate temporary identities to UEs, terminate Non-Access Stratum (NAS) signaling, check the authorization of the UE to camp on the service provider's Public Land Mobile Network (PLMN), and enforce UE roaming restrictions. The MME 112 may also be the termination point in the network for ciphering/integrity protection for NAS signaling and may be configured to handle the security key management. Lawful interception of signaling may also be supported by the MME. Still further, the MME 112 may also provide the control plane function for mobility between LTE and 2G/3G access networks with the S3 interface terminating at the MME from the SGSN (not shown). The MME 112 also terminates the S6a interface towards the home HSS for roaming UEs.

The HSS 114 may store subscription-related information (subscriber profiles), perform authentication and authorization of the user, provide information about the subscriber's location and IP information, and respond to subscription requests from the MME 112. The HSS 114 can provide subscription data using Update-Location Answer (ULA) responses by accessing its user database and providing the user information to the MME 114. The HSS is sometimes referred to as an authentication, authorization, and accounting (AAA) server because it can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. Further, the HSS 114 can be a master user database that supports IP multimedia subsystem (IMS) network entities that handle calls.

The SGW 116 is a data plane element, also referred to as a "user plane element," that can manage user mobility and interfaces with RANs. Being in the user plane, the SGW maintains data paths between eNBs 108 and the PGW 118 by forwarding and routing packets to and from the eNBs and the PGW. The SGW also serves as the local mobility anchor for inter-eNB handover and mobility between 3GPP networks. The SGW is configured to route and forward user data packets, while also acting as the mobility anchor for the user plane during inter-eNB handovers and as the anchor for mobility between LTE and other 3GPP technologies, terminating S4 interface and relaying the traffic between 2G/3G systems and the PGW. For idle state UEs, the SGW terminates the down link data path and triggers paging when down link data arrives for the UE. The SGW can manage and store UE contexts, e.g. parameters of the IP bearer service and network internal routing information, as well as perform replication of the user traffic in case of lawful interception.

In some embodiments, the SGW 116 may be implemented within an access gateway, not shown in FIG. 1 individually, that could implement a combination of additional functionalities such as a packet data serving node (PDSN) and/or a HRPD serving gateway (HSGW). Such an access gateway can communicate with an anchor gateway, not shown individually, which can implement a PGW, a Home Agent (HA), and an MME. On the radio access network side 102, such an anchor gateway can also communicate with an evolved packet data gateway (ePDG), not shown in FIG. 1, which may provide connectivity to the WiFi/Femto/other transceivers besides the eNB 108. On the packet core side 104, such an anchor gateway can communicate with the operator's IP service domain (not shown), an IP multimedia subsystem (IMS) (not shown), and the PDN 120. The AAA/HSS 114 may then communicate with such an access gateway, an anchor gateway, or both.

The PGW 118 provides connectivity for UEs to external packet data networks, shown in FIG. 1 as the PDN 120, which could e.g. be Internet, SIP-based IMS networks (fixed and mobile), or other similar networks. Thus, the PGW 118 acts as the interface between the LTE network and other packet data networks. The PGW serves as the anchor point for intra-3GPP network mobility, as well as mobility between 3GPP and non-3GPP networks. In some embodiments, the PGW 118 may act as the Policy and Charging Enforcement Function (PCEF), which manages Quality of Service (QoS), online/offline flow-based charging data generation, deep-packet inspection, and lawful intercept. The PGW 118 provides connectivity to the UE 110 to external packet data networks by being the point of exit and entry of traffic for the UE. A UE may have simultaneous connectivity with more than one PGW for accessing multiple packet data networks, such multiple PGWs and multiple PDNs not shown in FIG. 1. The PGW 118 may be configured to perform policy enforcement, packet filtering for each user, charging support, lawful interception, and packet screening. The PGW can also provide an anchor for mobility between 3GPP and non-3GPP technologies such as WiMAX and 3GPP2 standards (CDMA 1× and EVDO).

It should be understood that, in various embodiments, any number of eNBs, GWs, PDNs, and other elements shown in FIG. 1 in a singular form may be deployed in the communication system 100. Further, each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, the communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

Use of Forwarding Elements in SDN Service Core Deployment

Typically in mobility environments, a customer, such as e.g. a network operator, would configure multiple routing domains to provide differentiated services, and IP addresses are allocated to these routing domains.

In LTE deployment of access sessions, i.e. sessions where a subscriber wants to use a service and exchange data with an external PDN, call control signaling is used to assign one of the IP addresses, of a pool of IP addresses of the customer, to a subscriber (i.e. to a particular UE 110), which IP address is eventually used to carry data between the UE 110 of the subscriber and the PDN 120. Typically, the PGW 118 is in charge of assigning IP addresses for the access sessions. As previously described herein, IP addresses can be assigned using dynamic host configuration protocol (DHCP), Stateless Address Auto-configuration, default bearer activation, etc., or any suitable variation thereof.

In SDN architecture, call control and data forwarding is separated, where call control is implemented as a part of an SDN controller and data packets exchanged between the UE 110 and the PDN 120 are routed through external forwarders, referred to herein as "forwarding elements." The forwarding elements typically do not have much intelligence and have limited resources in terms of their processing power and memory and each forwarding element can't hold information related to all of the subscribers. Therefore, deployment of an SDN architecture requires special handling when it comes to allocating an IP pool of IP addresses that could be used for routing data to subscribers.

Effectively assigning or sharing an IP routing pool among forwarding elements is, therefore, one of the challenges in deployment of SDN architecture and improvements in that area are desired.

Proposed IP Routing Pool Distribution Among Forwarding Elements in SDN Deployment Embodiments of the present disclosure are based on recognition that it would be desirable to be able to effectively assign IP routing pool to forwarding elements in a manner that can achieve adequate load balancing among the forwarding elements and would be applicable to forwarding elements with limited processing and memory resources. To that end, in one aspect, a communication system is provided for facilitating load-balanced IP routing pool distribution among forwarding elements in SDN service core deployment. An example of such a communication system according to some embodiments of the present disclosure is illustrated in FIG. 2 as a communication system 200.

In accordance with one embodiment, the communication system 200 can overcome the aforementioned challenges (and others) by implementing an IP pool distribution method based on providing a feedback channel that allows a PGW to obtain information indicative of the load on the individual forwarding elements. Based on the information received via the feedback channel, the PGW may be configured to dynamically re-allocate at least some of the subsets of the entire pool of IP addresses between various forwarding elements, taking into consideration the loads of the forwarding elements. Such an implementation may allow mobility SDN core to offload millions of subscriber sessions to external forwarding elements and may eventually provide a significant competitive advantage as performance is crucial in data forwarding. In addition, the implementation allows using forwarding elements that have limited resources in terms of computational power and memory, by implementing the method substantially in the PGW.

Figure 2:
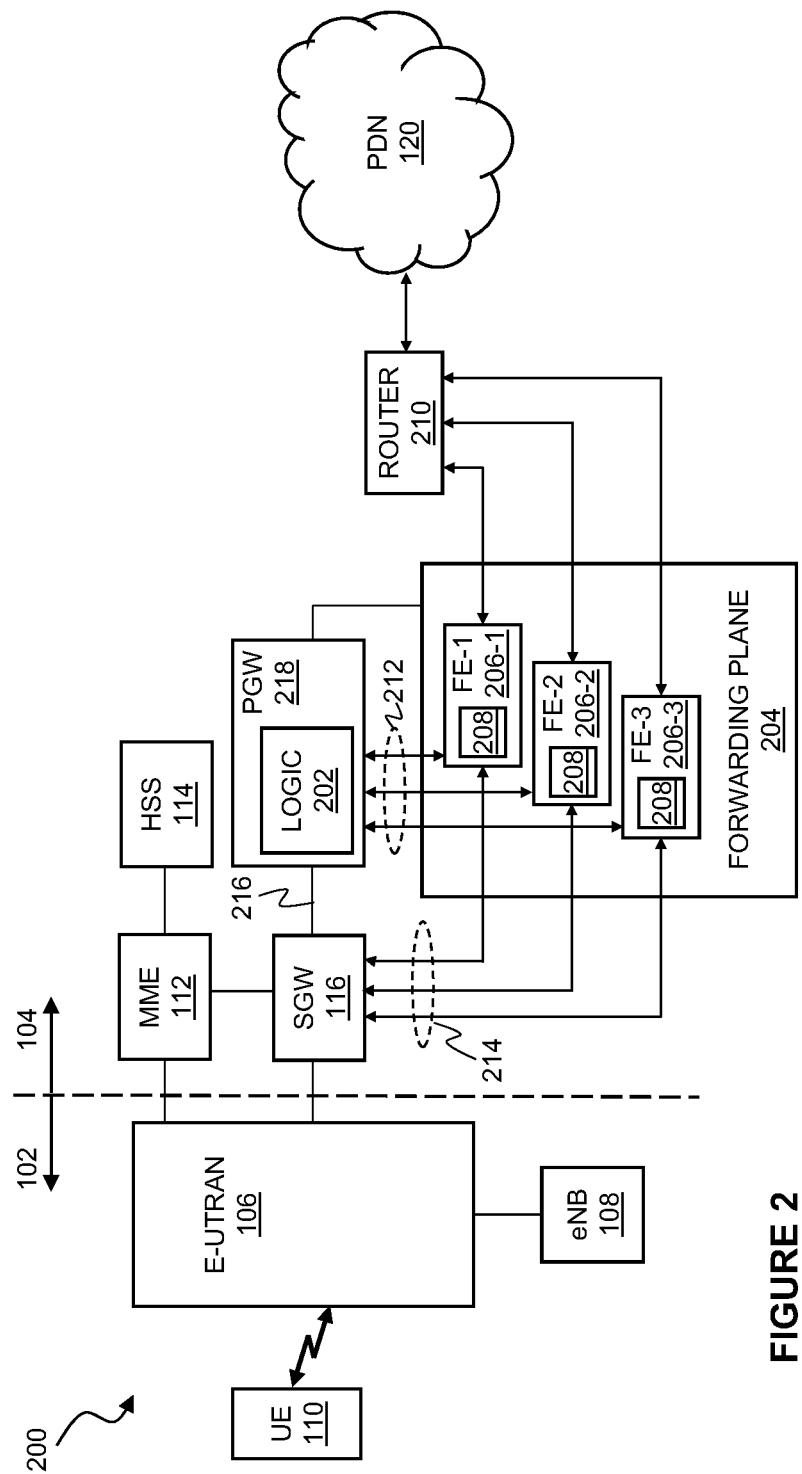
FIG. 2 illustrates a communication system for facilitating load-balanced IP routing pool distribution in a network environment, according to some embodiments of the present disclosure.

FIG. 2 illustrates a communication system 200 for facilitating load-balanced IP routing pool distribution in a network environment, according to some embodiments of the present disclosure. The communication system 200 includes all of the elements shown in FIG. 1, which description is applicable here and, therefore, in the interest of brevity, are not repeated. The PGW 218 is similar to the PGW 118 shown in FIG. 1, except that, in the embodiment shown in FIG. 2, the PGW 218 further includes IP pool distribution logic 202 configured to carry out IP pool distribution methods described herein, or configured to ensure that such methods are used to assign IP addresses of the IP routing pool.

FIG. 2 further illustrates a forwarding plane 204 comprising a plurality of forwarding elements (FEs) of the SDN architecture described above, forwarding elements shown in FIG. 2 as FE-1 206-1, FE-2 206-2, and FE-3 206-3. Of course, descriptions provided herein are equally applicable to deployments with other number of FEs besides 3 exemplary FEs shown in FIG. 2. Each of the FEs 206 may also include a corresponding logic 208 that is configured to support the load-balanced IP routing pool distribution described herein.

It should be noted that various repositories may be associated with the logic 202 and 208, not shown in FIG. 2. Furthermore, even though the logic 202 and 208 are illustrated in FIG. 2 as included within the PGW and FEs, respectively, in other embodiments, separate network elements or a plurality of network elements may implement functionality of each of the logic 202 and 208.

FIG. 2 further illustrates a router 210, which represents an edge router associated with the PGW 218 and configured to communicate routing information for the pool of IP addresses being distributed.

FIG. 2 also illustrates communication paths 212 between each FE and the PGW 218 and communication paths 214 between each FE and the SGW 116, with one path shown for each FE for both paths 212 and 214. The paths 212 are feedback channel paths described in greater detail below. The paths 214, as well as a path 216 between the SGW 116 and the PGW 218, may be communication channels in accordance with a GPRS Tunnelling Protocol (GTP) for carrying user data within the GPRS core network 104, i.e. GTP-U.

In one example implementation, logic 202, logic 208, PGW 218, FEs 206, MME 112, SGW 116, HSS 114, router 210 and other elements shown in FIG. 2 are network elements, which are meant to encompass network appliances, servers, routers, switches, gateways, bridges, loadbalancers, firewalls, processors, modules, or any other suitable device, component, element, or object operable to exchange information that facilitates or otherwise helps to provide load-balanced IP routing pool distribution as described herein. In other embodiments, these operations and/or features may be provided external to these elements, or included in some other network device/element or a plurality of elements to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

Figure 3:
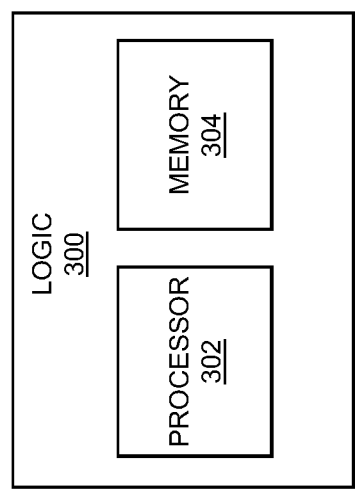
FIG. 3 illustrates a logical entity for assisting load-balanced IP routing pool distribution in a network environment, according to some embodiments of the present disclosure.

FIG. 3 illustrates a logical entity 300 for assisting load-balanced IP routing pool distribution in a network environment, according to some embodiments of the present disclosure. In various embodiments, either one or each of logic 202 and 208 may be implemented as the logical entity 300. FIG. 3 may be considered to illustrate exemplary internal structure associated with logic 202 and 208, as well as with any other elements shown in FIG. 2.

As shown in FIG. 3, the logic 300 may include at least one processor 302 and at least one memory element 304, along with any other suitable hardware and/or software to enable its intended functionality of ensuring load-balanced IP routing pool distribution as described herein. Similarly, each of the eNB 108, the UE 110, the MME 112, the HSS 114, the SGW 116, the PGW 218, and the router 210 may include memory elements for storing information to be used in achieving the load-balanced IP routing pool distribution operations as outlined herein, and a processor that can execute software or an algorithm to perform the load-balanced IP routing pool distribution activities as discussed in this Specification. Any of these devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to the logic 202 and 208, the eNB 108, the UE 110, the MME 112, the HSS 114, the SGW 116, the PGW 218, and the router 210 could be provided in any database, register, control list, cache, or storage structure, all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and UE (e.g., mobile nodes) can also include suitable interfaces for receiving, transmitting, and/or otherwise communicating data or information in a network environment.

Note that in certain example implementations, the load-balanced IP routing pool distribution mechanisms as outlined herein may be implemented by logic encoded in one or more tangible media, which may be inclusive of non-transitory media, e.g., embedded logic provided in an ASIC, in DSP instructions, software [potentially inclusive of object code and source code] to be executed by a processor, or other similar machine, etc. In some of these instances, memory elements, such as e.g. memory 304 shown in FIG. 3, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. processor 302 shown in FIG. 3, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 4:
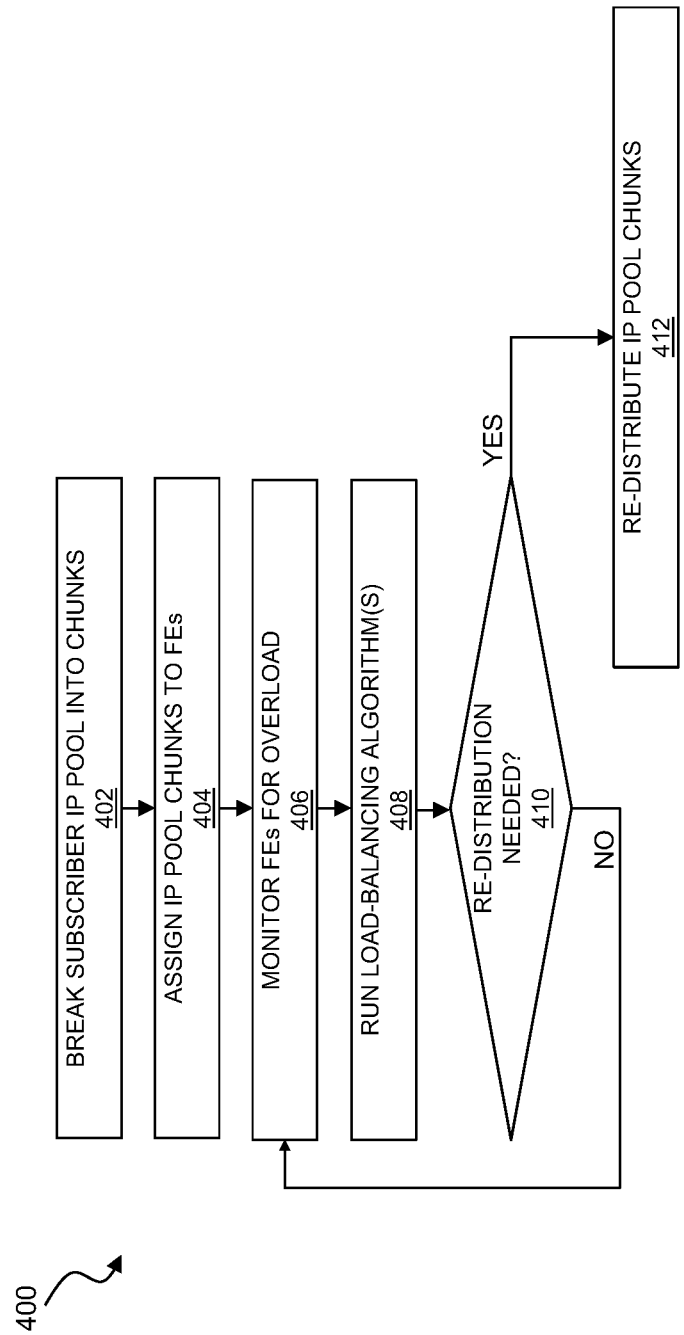
FIG. 4 is a simplified flow diagram illustrating example operations associated with providing load-balanced IP routing pool distribution in a network environment, according to some embodiments of the present disclosure.

FIG. 4 is a simplified flow diagram 400 illustrating example operations associated with providing load-balanced IP routing pool distribution in a network environment, according to some embodiments of the present disclosure. The operations of FIG. 4 are now described with reference to two forwarding elements, e.g. FE-1 and FE-2 shown in FIG. 2, but analogous steps may be performed for other FEs of the forwarding plane 204.

In this context, the method 400 may begin as shown with a box 402, where the logic 202 initially breaks up a subscriber IP pool of IP addresses into chunks, i.e. subsets, of IP addresses. The subscriber pool of IP addresses could e.g. comprise IP addresses available for subscribers in a certain deployment, e.g. available for subscribers of a certain network operator.

The method 400 may then proceed with the logic 202 assigning at least some of the IP pool chunks to the various FEs 206 available in the forwarding plane 204 (box 404 in FIG. 4).

In one embodiment, the logic 202 may be configured to designate some IP pool chunks as "static" in that, once assigned to a particular FE during the implementation of the box 404 of FIG. 4, the IP addresses of those chunks will not be re-assigned to other FEs. Other IP pool chunks may be designated as "dynamic" in that, following their assignment to a particular FE during the implementation of the box 404 of FIG. 4, the IP addresses of those chunks can be re-assigned to other FEs, e.g. on as-needed basis as a result of implementing load-balancing algorithm(s).

In one embodiment of implementing the box 404 of FIG. 4, the logic 202 may be configured to assign less than 100% of all of the IP addresses of the IP pool, e.g. 75% of all of the IP addresses, in order to leave some buffer for providing additional IP addresses to certain FEs on as-needed basis. For example, the logic 202 may be configured to only assign static pool chunks in box 404, leaving assignment of dynamic pool chunks to a later point in time, when, based on the load-balancing algorithm, it is determined that re-distribution of IP pool is needed.

For example, consider that a particular network operator owns 10.0.0.0/8 pool of IP addresses and three forwarding elements are available, e.g. FE-1, FE-2, and FE-3. In such an example, when implementing the box 404, the logic 202 may be configured to assign static pool (SP) chunks of IP addresses as follows:

SP1→10.0.0.0/12 (10.0.0.0-10.15.255.255)→FE1
SP2→10.16.0.0/12 (10.16.0.0-10.31.255.255)→FE2
SP3→10.32.0.0/12 (10.32.0.0-10.47.255.255)→FE3

Continuing with this example, dynamic pool (DP) chunks may be assigned to FEs based on load-balancing algorithm run as shown with a box 408, where dynamic pool chunks may be arranged as follows, with 65536 IP addresses, i.e. with that many subscribers, per pool: DP1→10.48.0.0/16, . . . , DP20→10.68.0.0/16

In various embodiments, when implementing the box 404 of FIG. 4, the logic 202 may be configured to assign any number of IP pool chunks, static and/or dynamic, to any FE.

In one embodiment of implementing the box 404 of FIG. 4, the logic 202 may be configured to assign IP pool chunks equally to the FEs, i.e. each FE may be assigned the same number of IP addresses. In other embodiments, some FEs may be assigned more IP addresses than others, which could depend e.g. on the resources available to the different FEs, expectation about the durations of subscriber access sessions using different IP addresses, and other considerations, all of which are within the scope of the present disclosure.

Following assignment of box 404 of FIG. 4, the logic 202 may, optionally, be configured to provide information regarding the assignment of IP addresses to an entity that can advertise the assigned routes to other systems, e.g. to the edge router 210 of an autonomous system associated with the PGW 218. This step is not shown in FIG. 4.

A brief background regarding route advertisements is now provided.

A network environment where data is exchanged may be viewed as a collection of Autonomous Systems, where an "Autonomous System" (AS) typically refers to a set of network elements, such as e.g. routers, switches, and controllers, under a single technical administration. Segregation into different AS's allows defining administrative authorities and routing policies of different organizations. Each AS is "autonomous" (i.e., relatively independent from the other AS's) in the sense that is runs its own independent routing policies and unique Interior Gateway Protocols (IGPs). For example, the cellular wireless network comprising the radio access part 102 and the core network 104 could be considered to be an AS.

Exterior routing protocols were created, the current standard EGP being the Border Gateway Protocol (BGP), to exchange routing information between different AS's, a process often referred to as "route advertisement." For example, the BGP defines an inter-AS routing protocol, where one of the primary functions is to exchange network reachability information (NLRI) using a so-called "BGP speaking system" (also often referred to as a "BGP speaker") by means of sending so-called "update messages." NLRI may be viewed as a name of a particular field in a BGP update message, the field encoding one or more IP addresses, the IP addresses also referred to in that context as routes, prefixes, IP address prefixes, or destinations.

AS's communicate within and with each other by means of routers. Routers in one AS that are configured to communicate with routers in other AS's are referred to as "edge routers", while routers in one AS that are only configured to communicate with other routes in the same AS are referred to as "core routers." For example, the router 210 shown in FIG. 2 could be considered to be an edge router because it may communicate with edge routers in other AS's, e.g. in AS's in the PDN 120.

As mentioned above, a BGP speaker, which is typically, but not necessarily, implemented in an edge router, is used to exchange NLRI with other BGP systems, where the NLRI is exchanged between BGP routers in update messages used to send routing updates to peers. When a BGP session is initialized, update messages are sent until the complete BGP table has been exchanged. Every time an update message is received, the BGP routing table is updated and the BGP route table version is incremented by one. Thus, communicating network elements initially exchange their entire BGP routing table, and then send incremental updates, using update messages.

Besides NLRI, an update message typically also includes path attributes. The NLRI may include one or more routes (i.e. IP address prefixes), as well as multiple path attributes. If a BGP speaker chooses to advertise a route, it may add to or modify the path attributes of the route before advertising it to a peer.

Within an update message, routes are advertised between a pair of BGP speakers with the NLRI comprising a destination field listing, in a form of IP address prefixes, IP addresses of the systems to which the routing information relates. The actual routing information is included in a path attributes field of the same update message by listing path attributes, such as ORIGIN, AS_PATH, NEXT_HOP, etc.

In BGP, path attributes may be categorized into four following categories: 1) well-known, mandatory attributes, 2) well-known discretionary attributes, 3) optional, transitive attributes, and 4) optional, non-transitive attributes. The path attributes of the first category must appear in every update message and must be supported by all BGP implementations. If such an attribute is missing from an update message, a notification message is sent to a peer. Such attributes include e.g. AS_PATH, ORIGIN, and NEXT_HOP.

The path attributes of the second category may or may not appear in an update message but must be supported by all BGP implementations. Such attributes include e.g. LOCAL_PREF and ATOMIC_AGGREGATE.

The path attributes of the third category may or may not be supported by all BGP implementations. If it is sent in an update message but not recognized by the receiver, it should be passed on to the next AS. Such attributes include e.g. AGGREGATOR and COMMUNITY.

The path attributes of the fourth category may or may not be supported by all BGP implementations and, if received, it is not required that the router passes it on. Such attributes include e.g. MULTI_EXIT_DISC, ORIGINATOR_ID, and CLUSTER_LIST.

Turning back to the optional step of the logic 202 providing information regarding the assignment of IP addresses in box 404 to an entity that can advertise the assigned routes to other systems, such a step would enable a speaker, e.g. within the edge router 210, to start advertising routes for the assigned IP addresses indicating an IP address of a respective FE in the NEXT_HOP field of path attributes for the IP addresses assigned to that FE, thus indicating the respective FE as the next closest routing element a data packet can to through in order to reach a subscriber.

Turning back to the method 400, as shown with a box 406, the logic 202 may then monitor FEs for overload. To that end, the logic 202 may be configured to receive, from each of the FEs to which at least one IP pool chunk was assigned, information indicative of the load on the FE. The FEs 206 may be configured to provide this information to the logic 202 via feedback channels 212, shown in FIG. 2, e.g. using an Open Flow protocol. In an embodiment, such information includes information indicative of packet and/or byte count of data traffic processed by the respective FE. In this manner, the logic 202 is advantageously configured to monitor each FE for overload using real-time traffic feedback.

The logic 202 may then be configured to use the information received from the FEs in box 406 to run one or more load-balancing algorithms (box 408 in FIG. 4) and to determine, based on the execution of the load-balancing algorithms, whether re-distribution of IP pool chunks is necessary (box 410).

If the logic 202 determines that re-distribution is not necessary, meaning that the load is distributed among the FEs in an acceptable manner, then the logic 202 continues to monitor FEs, as illustrated in FIG. 4 with an arrow from box 410 to box 406.

If, in 410, the logic 202 determines that re-distribution is necessary, meaning that at least one of the FEs is either overloaded or underloaded in a manner that is not acceptable according to certain conditions that the logic 202 checks, then the logic 202 proceeds to re-distribute IP pool chunks in order to achieve, or at least attempt to achieve, distribution that is acceptable in terms of load-balancing (box 412 in FIG. 4). It should be noted that, even when proceeding to perform re-distribution of box 412, the logic 202 may be configured to continue to monitor FEs as described above.

Figure 5:
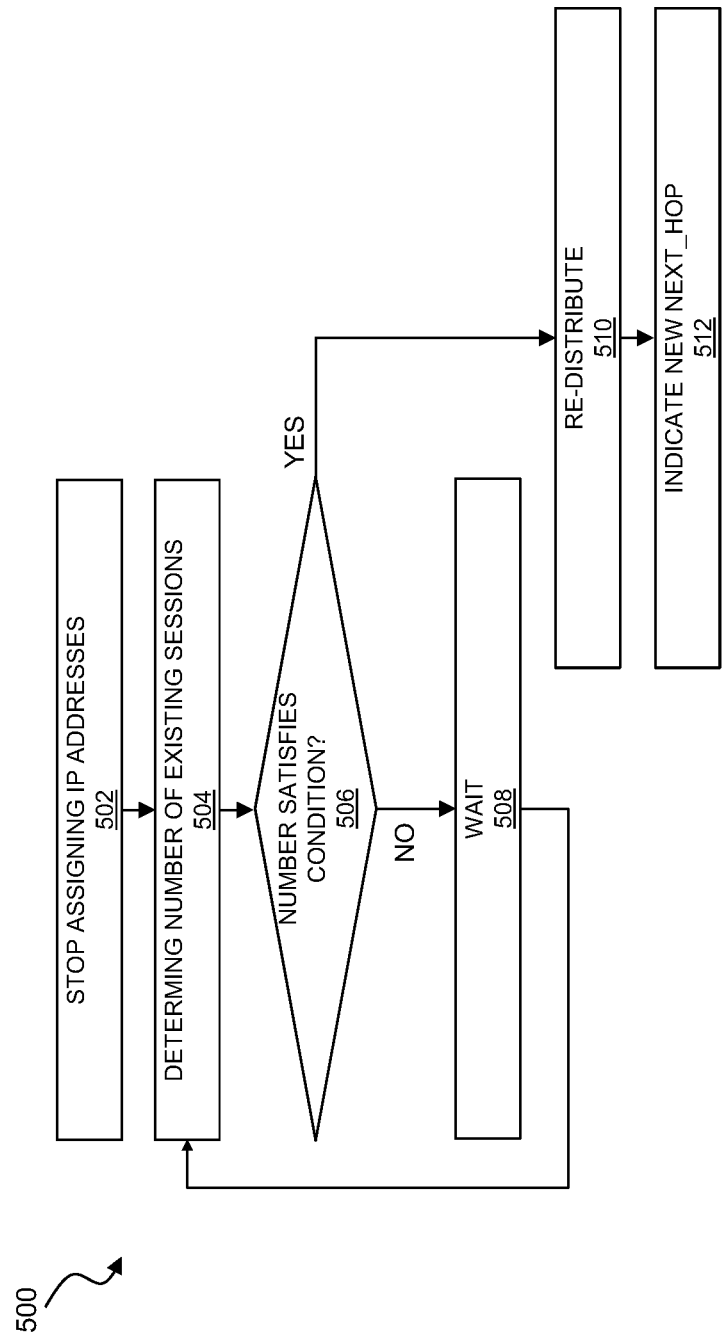
FIG. 5 is a simplified flow diagram illustrating example operations associated with re-assigning an IP pool chunk from one forwarding element to another forwarding element, according to some embodiments of the present disclosure.

One example of how box 412 may be implemented is shown in FIG. 5.

FIG. 5 is a simplified flow diagram 500 illustrating example operations associated with re-assigning an IP pool chunk from one forwarding element to another forwarding element, according to some embodiments of the present disclosure. For ease of explanation, consider that, as a result of performing the load-balancing of box 408, the logic 202 determined that an IP pool chunk currently assigned to FE-1 needs to be re-assigned to the FE-2. This could be e.g. because FE-1 is overloaded or/and because FE-2 is underloaded.

The logic 202 may then wait and ensure that all, or a large portion, of subscriber sessions using IP addresses from that IP pool chunk are drained out from the overloaded FE-1, before performing the re-assignment. To that end, the logic 202 may be configured to temporarily stop assigning IP addresses from that IP pool chunk to new subscriber sessions (box 502 in FIG. 5) and determine the number of existing subscriber sessions utilizing IP addresses from the IP pool chunk to be re-assigned (box 504 in FIG. 5).

The logic 202 then determines whether the number determined in box 504 satisfies one or more conditions, e.g. the number is below a certain threshold (box 506 in FIG. 5).

For example, in one embodiment, a threshold condition could indicate that there should not be any existing subscriber sessions using the IP addresses from the IP pool chunk to be re-assigned prior to re-assignment. Such an embodiment may advantageously ensure that no subscriber sessions are disrupted due to movement of the IP pool chunk from FE-1 to FE-2.

In other embodiments, a threshold condition could indicate that some, typically relatively small, number of existing subscriber sessions is an acceptable cost for achieving the overall benefit of an improved load distribution among the FEs. In such an embodiment, a threshold could be a number of existing sessions that may still be alive when initiating the re-assignment.

In other embodiments, a threshold condition could indicate that a time limit has expired and that having any remaining subscribers is an acceptable cost for achieving the overall benefit of an improved load distribution among the FEs. In such an embodiment, a threshold could be a duration of the re-distribution when initiating the re-assignment.

If, in box 506, the logic 202 determines that the one or more conditions are not satisfied, the logic 202 waits for a certain amount of time (box 508 in FIG. 5). In various embodiments, the wait period of box 508 could be pre-defined (i.e. static), or dynamically defined, e.g. based on network conditions at the time. After the wait period of box 508, the method 500 proceeds to determining the number of existing subscriber sessions again, as shown in FIG. 5 with an arrow from the box 508 back to the box 504.

When, in box 506, the logic 202 determines that the one or more conditions are satisfied, the logic 202 proceeds to re-distributing the IP routing pool by at least re-assigning the IP pool chunk in question from FE-1 to FE-2 (box 510 in FIG. 5). Thus, the logic 202 reprograms the IP pool chunk to the correct FE, now FE-2, based on the load.

After that, the logic 202 may stop the pause on assigning IP addresses from that IP pool chunk that was set in box 502 and start assigning IP addresses from that IP pool chunk again.

Optionally, the logic 202 also provides an indication that FE-2 should be the new NEXT_HOP for the BGP update messages carrying routing information for the IP addresses of the newly re-assigned IP pool chunk (step 512 in FIG. 5). BGP updates messages may be sent encoding new NEXT_HOP in the manner as described above for distributing routing information for the original FE assignments.

Figure 6:
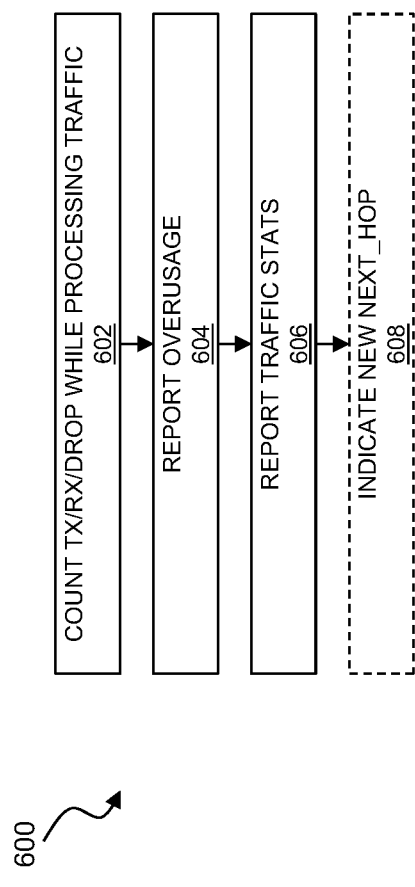
FIG. 6 is a simplified flow diagram illustrating example operations associated with forwarding elements assisting load-balanced IP routing pool distribution in a network environment, according to some embodiments of the present disclosure.

FIG. 6 is a simplified flow diagram 600 illustrating example operations associated with forwarding elements assisting load-balanced IP routing pool distribution in a network environment, according to some embodiments of the present disclosure. The method 600 may be performed e.g. by the logic 208 within an FE.

Box 602 in FIG. 6 illustrates that a FE may be configured to count packets that were transmitted (TX), received (RX), and/or dropped by it while processing traffic going through the FE.

Box 604 illustrates that a FE may, optionally, be configured to promptly report any indication of existing or upcoming overuse to the logic 202.

Box 606 illustrates that a FE may be configured to report the counts of box 602, and/or information derived from these counts, to the logic 202, via the feedback channels 212.

Box 608 illustrates that, optionally, it is the FE that may be configured to provide an indication to a BGP speaker, e.g. within the router 210, that the should be indicated in the new NEXT_HOP for the BGP update messages carrying routing information for the IP addresses assigned to that FE. This may be performed by the FE both for the initially assigned IP pool chunks (i.e. one or more chunks assigned to the FE as a part of box 404 of FIG. 4) and for the newly re-assigned IP pool chunk(s). BGP updates messages may be sent encoding new NEXT_HOP in the manner as described above.

Above, advertisement of routes is described in context of BGP, where improved distribution of the IP routing pool is assisted by ensuring that an identification of a respective FE assigned to each IP address is encoded in the NEXT_HOP field of a BGP update message for that IP address. A person of ordinary skill in the art will, however, readily recognize that these teachings are equally applicable to other embodiments and to protocols other than eBGP, all of which, therefore, being within the scope of the present disclosure. Further, unless technically not feasible, the BGP and the BGP update messages describe herein may refer, respectively, to BGPSEC and BGPSEC update messages, as well as to Ethernet Virtual Private Network (EVPN) BGP and EVPN BGP update messages. As is known in the art, BGPSEC is a relatively recent extension to the BGP, providing cryptographic assurance to a BGP speaker who receives a valid BGPSEC route advertisement in that the advertised route has the property that every AS on the path of AS's listed in the advertisement has explicitly authorized the advertisement of the route to the subsequent AS in the path. On the other hand, EVPN BGP refers to using BGP as a control protocol in Network Virtualization Overlay (NVO) solutions to distribute tenant system reachability and underlay tunnel endpoint information in context of an L2 Virtual Private Network (L2VPN) solution over IP/MPLS networks.

It is also important to note that the steps in the appended diagrams illustrate only some of the possible signaling scenarios and patterns that may be executed by, or within, the communication system 200. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding example operations and use cases have been offered for purposes of example and discussion. Substantial flexibility is provided by the communication system 200 in that any suitable arrangements, chronologies, configurations, and timing mechanisms may be provided without departing from the teachings provided herein.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to scalable handling of BGP route information in VXLAN with EVPN control plane. This may be inclusive of appropriate algorithms and communication protocols that allow for the effective exchange of data or information.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A system for providing load-balanced Internet Protocol (IP) pool distribution, the system comprising:
   at least one memory element configured to store computer executable instructions, and at least one processor coupled to the at least one memory element and configured, when executing the instructions, to:
   assign a plurality of IP pool chunks to a plurality of forwarding elements, wherein each IP pool chunk comprises a plurality of IP addresses;
   receive, from each of the plurality of forwarding elements, load information for each forwarding element;
   perform load balancing using the load information for each forwarding element to determine whether re-assignment of the plurality of IP pool chunks is needed;
   when re-assignment of the plurality of IP pool chunks is needed, un-assign at least one IP address of at least one IP pool chunk assigned to a first forwarding element;
   wait for a predetermined period of time; and
   re-assign, after the predetermined period of time has elapsed, the at least one IP pool chunk from the first forwarding element to a second forwarding element.

2. The system according to claim 1, wherein the at least one processor is further configured to:
   stop assigning of IP addresses of the at least one IP pool chunk to new subscriber sessions, and
   re-assign the at least one IP pool chunk from the first forwarding element to the second forwarding element when all existing subscriber sessions utilizing IP addresses of the at least one IP pool chunk have finished.

3. The system according to claim 1, wherein the at least one processor is further configured to:
stop assigning of IP addresses of the at least one IP pool chunk to new subscriber sessions,
determine whether a number of existing subscriber sessions that utilize any of the plurality of IP addresses of the at least one IP pool chunk satisfy one or more conditions, and
re-assign the at least one IP pool chunk from the first forwarding element to the second forwarding element upon positive determination.

4. The system according to claim 1, wherein the at least one processor is further configured to trigger advertisement of IP addresses of the at least one IP pool chunk after the at least one IP pool chunk has been re-assigned from the first forwarding element to the second forwarding element.

5. The system according to claim 4, wherein advertising IP addresses of the at least one IP pool chunk comprises sending one or more Border Gateway Protocol (BGP) update messages comprising network layer reachability information (NLRI) for the IP addresses of the at least one IP pool chunk and a NEXT HOP path attribute encoding an identification of the second forwarding element.

6. The system according to claim 1, wherein the load information for each forwarding element comprises information indicative of packet and/or byte count of data traffic processed by the forwarding element, and/or wherein the load information for each forwarding element is received using an Open Flow protocol.

7. The system according to claim 1, wherein the system is a packet data network gateway (PGW).

8. The system according to claim 1, further comprising the plurality of forwarding elements.

9. A method for providing load-balanced Internet Protocol (IP) pool distribution, comprising:
assigning a plurality of IP pool chunks to a plurality of forwarding elements, wherein each IP pool chunk comprises a plurality of IP addresses;
receiving, from each of the plurality of forwarding elements, load information for each forwarding element;
performing load balancing using the load information for each forwarding element to determine whether re-assignment of the plurality of IP pool chunks is needed; and
when re-assignment of the plurality of IP pool chunks is needed, un-assigning at least one IP address of at least one IP pool chunk assigned to a first forwarding element;
waiting for a predetermined period of time; and
re-assigning, after the predetermined period of time has elapsed, the at least one IP pool chunk from the first forwarding element to a second forwarding element.

10. The method according to claim 9, further comprising:
stopping assigning of IP addresses of the at least one IP pool chunk to new subscriber sessions, and
re-assigning the at least one IP pool chunk from the first forwarding element to the second forwarding element when all existing subscriber sessions utilizing IP addresses of the at least one IP pool chunk have finished.

11. The method according to claim 9, further comprising:
stopping assigning of IP addresses of the at least one IP pool chunk to new subscriber sessions,
determining whether a number of existing subscriber sessions that utilize any of the plurality of IP addresses of the at least one IP pool chunk is below a threshold, and
re-assigning the at least one IP pool chunk from the first forwarding element to the second forwarding element upon positive determination.

12. The method according to claim 9, further comprising assigning IP addresses of the at least one IP pool chunk to new subscriber sessions after the at least one IP pool chunk has been re-assigned from the first forwarding element to the second forwarding element.

13. The method according to claim 9, further comprising triggering advertisement of IP addresses of the at least one IP pool chunk after the at least one IP pool chunk has been reassigned from the first forwarding element to the second forwarding element.

14. The method according to claim 9, wherein each IP address of the plurality of IP addresses is an IP address for carrying user data between a User Equipment (UE) and an external packet data network (PDN) over a cellular wireless telecommunications network.

15. One or more non-transitory tangible media encoding logic that include instructions for execution that, when executed by a processor, are operable to perform operations for providing load-balanced Internet Protocol (IP) pool distribution comprising:
assigning a plurality of IP pool chunks to a plurality of forwarding elements, wherein each IP pool chunk comprises a plurality of IP addresses;
receiving, from each of the plurality of forwarding elements, load information for each forwarding element;
performing load balancing using the load information for each forwarding element to determine whether re-assignment of the plurality of IP pool chunks is needed;
when re-assignment of the plurality of IP pool chunks is needed, un-assigning at least one IP address of at least one IP pool chunk assigned to a first forwarding element;
waiting for a predetermined period of time; and
re-assigning, after the predetermined period of time has elapsed, the at least one IP pool chunk from the first forwarding element to a second forwarding element.

16. The media according to claim 15, wherein the operations further comprise:
stopping assigning of IP addresses of the at least one IP pool chunk to new subscriber sessions,
determining whether a number of existing subscriber sessions that utilize any of the plurality of IP addresses of the at least one IP pool chunk is below a threshold, and
re-assigning the at least one IP pool chunk from the first forwarding element to the second forwarding element upon positive determination.

17. The media according to claim 15, the operations further comprising providing an instruction for advertising IP addresses of the at least one IP pool chunk after the at least one IP pool chunk has been re-assigned from the first forwarding element to the second forwarding element.

18. The media according to claim 17, wherein advertising IP addresses of the at least one IP pool chunk comprises sending one or more Border Gateway Protocol (BGP) update messages comprising network layer reachability information (NLRI) for the IP addresses of the at least one IP pool chunk and a NEXT HOP path attribute encoding an identification of the second forwarding element.

19. The media according to claim 15, wherein the load information for each forwarding element comprises information indicative of packet and/or byte count of data traffic processed by the forwarding element.

20. The media according to claim 15, wherein each IP address of the plurality of IP addresses is an IP address for carrying user data between a User Equipment (UE) and an external packet data network (PDN) over a cellular wireless telecommunications network.

* * * * *